(12) United States Patent
Chen et al.

(10) Patent No.: US 7,151,441 B2
(45) Date of Patent: Dec. 19, 2006

(54) VEHICLE BURGLAR ALARM SYSTEM WITH GPS RECOGNITION

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

( * ) Notice: Subject to any disclaimer, the term of this patent is extended or adjusted under 35 U.S.C. 154(b) by 189 days.

(21) Appl. No.: 11/017,949

(22) Filed: Dec. 22, 2004

(65) Prior Publication Data

US 2006/0103510 A1    May 18, 2006

(30) Foreign Application Priority Data

Oct. 29, 2004    (JP)    .............................. 93133009 A

(51) Int. Cl.
*B60R 25/10*    (2006.01)

(52) U.S. Cl. ........................... 340/426.19; 340/539.13; 340/539.21; 340/988; 340/992; 307/10.2; 701/9; 701/213

(58) Field of Classification Search ........... 340/426.19, 340/426.2, 426.25, 426.26, 426.27, 426.28, 340/426.29, 539.13, 539.21, 540, 541, 440, 340/10.2, 988, 989, 991, 992; 307/9.1, 10.2, 307/10.3; 701/9, 200, 213, 214

See application file for complete search history.

(56) References Cited

U.S. PATENT DOCUMENTS

| 5,432,495 | A  | * | 7/1995  | Tompkins ................... 340/429 |
| 5,796,178 | A  | * | 8/1998  | Onuma ...................... 307/10.2 |
| 6,278,938 | B1 | * | 8/2001  | Alumbaugh ................ 701/208 |
| 6,356,841 | B1 | * | 3/2002  | Hamrick et al. ............ 701/213 |
| 6,539,303 | B1 | * | 3/2003  | McClure et al. ............ 701/213 |
| 6,801,124 | B1 | * | 10/2004 | Naitou ................... 340/426.19 |
| 6,809,659 | B1 | * | 10/2004 | Flick et al. ................. 340/989 |

* cited by examiner

*Primary Examiner*—Davetta W. Goins
(74) *Attorney, Agent, or Firm*—Bacon & Thomas, PLLC

(57) ABSTRACT

A vehicle burglar alarm system includes a global position system installed in a vehicle for receiving a satellite signal, and an on-vehicle main unit installed in the vehicle and electrically connected with the global position system, the on-vehicle main unit having a first flag, the first flag having a first status without satellite signal and a second status with satellite signal for indicating satellite receiving status of the global position system, the on-vehicle main unit being to output a relocation signal immediately after changing of the first flag from the first status without satellite signal to the second status with satellite signal during burglar alarming mode.

6 Claims, 2 Drawing Sheets

VEHICLE BURGLAR ALARM SYSTEM WITH GPS RECOGNITION

BACKGROUND OF THE INVENTION

1. Field of the Invention

The present invention relates to a vehicle burglar alarm system and more particularly, to a vehicle burglar alarm system with GPS (Global Position System) recognition, which controls the operation of the alarm subject to the satellite signal receiving status of the GPS.

2. Description of Related Art

In order to prevent stealing of the vehicle by a thief or the occurrence of abnormal conditions, the vehicle owner will equipped the vehicle with a vehicle alarm system. After leaving from the vehicle, the vehicle owner can initiate the burglar alarm mode of the vehicle burglar alarm system, driving different sensors to detect different locations at the vehicle.

When an abnormal vehicle condition is encountered, for example, an intruder enters the vehicle, the respective sensor is induced to trigger the alarm of the vehicle burglar alarm system. A vehicle burglar alarm system generally uses a siren for producing a sharp sound to call people's attention and to frighten the thief into running away, or to have the vehicle owner come back to the parking side of the vehicle to check the abnormality when heard the sharp sound of the siren.

The sharp sound of a siren can frighten the thief into running away, however it is hearable within a limited distance. The vehicle owner may be not able to hear the sharp sound of the siren when the vehicle burglar alarm system of his (her) vehicle is triggered, thereby missing the chance of saving the vehicle. Further, if a tow truck is towing the vehicle and the siren of the vehicle burglar alarm system keeps making a loud sharp sound, the owner of the vehicle may not find this status. In this case, the owner of the vehicle cannot trace the vehicle, and the owner of the vehicle knows that the vehicle has been towed to another place by a tow truck only when returned to the parking side. These conditions occur just because the vehicle burglar alarm system does not provide the function of actively informing the owner of the vehicle of the occurrence of an abnormality. Further, the noise of the loud sharp sound of the siren of a vehicle burglar alarm system is not friendly to the surroundings.

In recent years, a car may be equipped with a GPS (Global Position System) for navigation. As shown in FIG. 1, when a vehicle is at a local area 200 without shelter and the GPS of the vehicle is started, the GPS receive satellite signal from a group of satellites 101~108 through the many channels thereof. After initiation, the GPS receives time signal from the satellites 101~108. Thereafter, the satellites 101~108 are classified into sets each including three satellites, and then the set of satellites having the least HDOP (Horizontal Dilution of Precision) value is selected for computing the location of the GPS. For example, satellites 101, 102 and 108 are the same set, and the signals of the satellites 101, 102 and 108 are used for the computation of the location of the GPS if the HDOP value of the set of satellites 101, 102 and 108 is the least.

If the satellite signal of the satellite 108 is blocked and not receivable, the satellite signals from the satellites of another set having the second least HDOP value are used for the computation of the location of the GPS. However, when the car entered a tunnel, parking tower, or sheltered place, the GPS receives no satellite signal, and it takes about 10~30 minutes to reboost the GPS. The use of a GPS in a vehicle burglar alarm system in accordance with conventional techniques may encounter cannot effectively prohibit a thief from stealing the car when the car is parking at a parking tower or sheltered place. Because rebosting the GPS takes about 10~30 minutes, the car owner may know the location of the car after the car has been moved by the thief to a place far away from the parking place. If the thief put the car in a cargo container before completion of rebosting of the GPS, the GPS cannot compute the location.

Therefore, it is desirable to provide a vehicle burglar alarm system with GPS recognition that eliminates the aforesaid problem.

SUMMARY OF THE INVENTION

The present invention has been accomplished under the circumstances in view. It is therefore the main object of the present invention to provide a vehicle burglar alarm system with GPS recognition, which actively detects the presence of satellite signal within the communication area and stores the corresponding flag so as to automatically inform the vehicle owner of the vehicle status when the flag is changed from the status without satellite signal to the status with satellite signal. It is another object of the present invention to provide a vehicle burglar alarm system with GPS recognition, which automatically informs the vehicle owner of the status of the vehicle when an abnormal status of the vehicle occurred.

To achieve these and other objects of the present invention, the vehicle burglar alarm system with GPS recognition comprises a GPS (global position system) and an on-vehicle main unit. The GPS is installed in a vehicle and adapted to receive at least one satellite signal. The on-vehicle main unit is installed in the same vehicle, having a first flag stored therein and having electrically connected thereto at least one sensor, at least one alarm and the global position system. The at least one sensor being installed in the vehicle in a predetermined position, and adapted to output a corresponding abnormal signal to the on-vehicle main unit. The on-vehicle main unit controlling the at least one alarm to output an alarm signal correspondingly. The first flag comprising a first status without satellite signal and a second status with satellite signal for indicating satellite receiving status of the GPS. When the first flag is changed from the first status without satellite signal to the second status with satellite signal after the on-vehicle main unit has been set into the burglar alarming mode, the on-vehicle main unit will output a relocation signal to the at least one alarm and control the at least one alarm to output another alarm signal.

DETAILED DESCRIPTION OF THE PREFERRED EMBODIMENT

Figure 1:
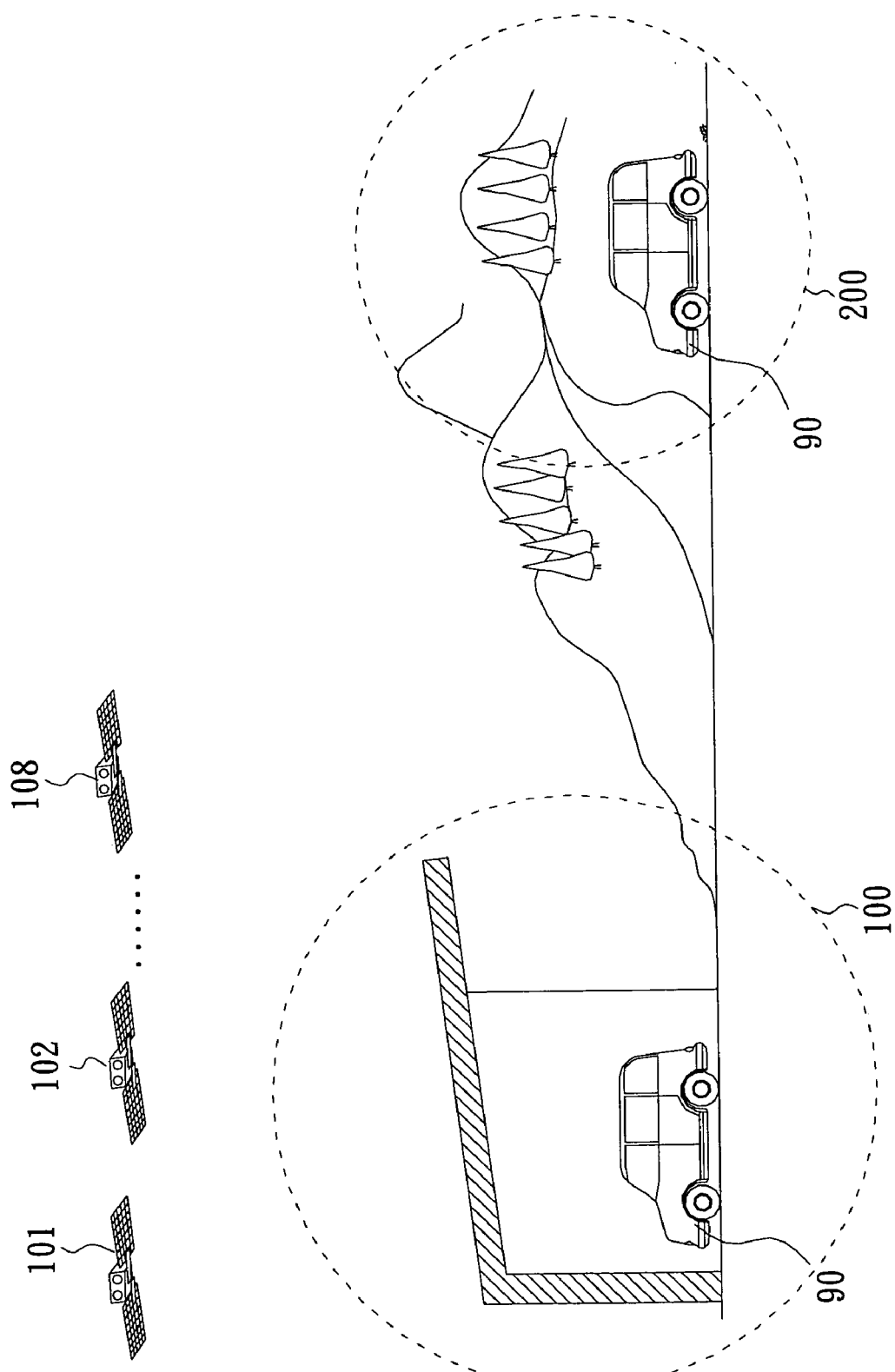
FIG. 1 is a schematic drawing showing the operation environment of the preferred embodiment of the present invention.
Figure 2:
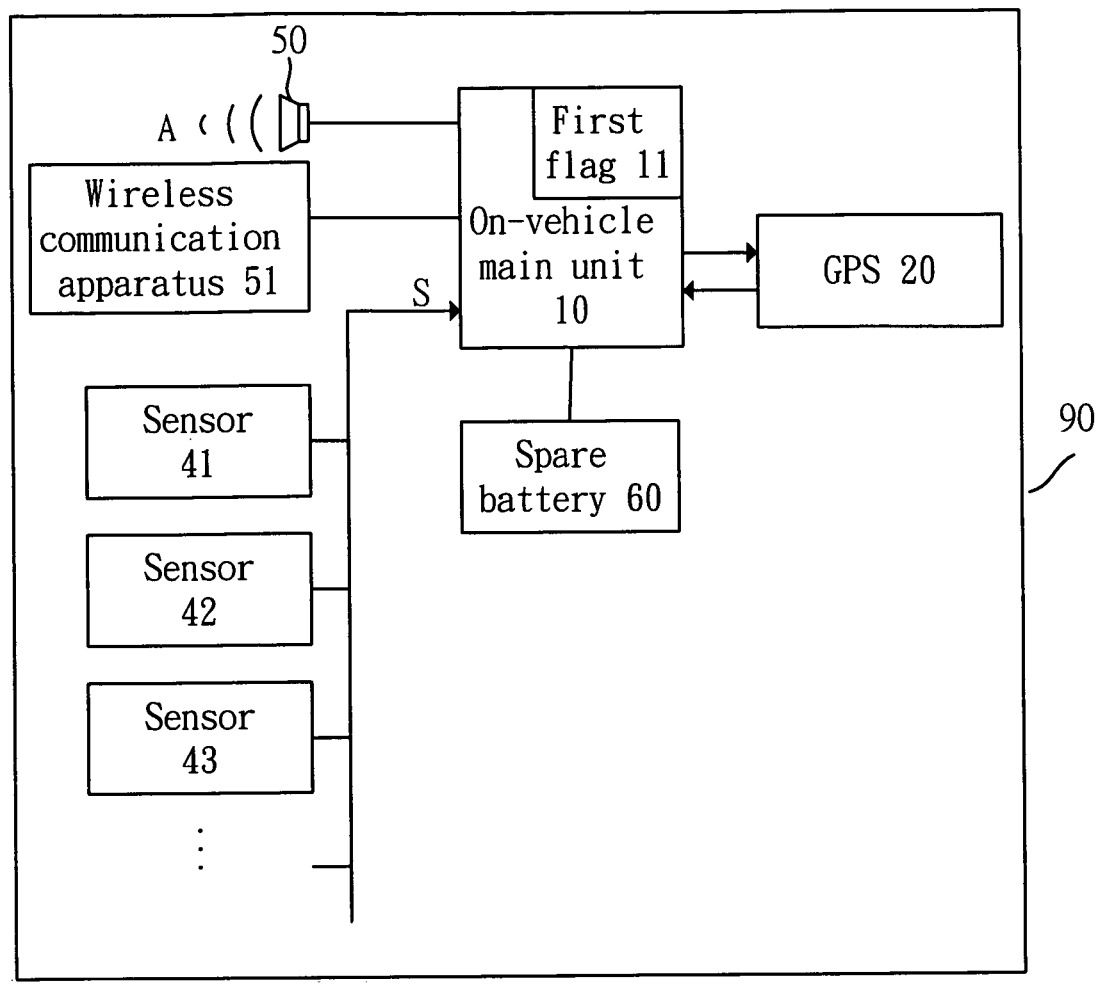
FIG. 2 is a system functional block diagram of the preferred embodiment of the present invention.
Figure 3:
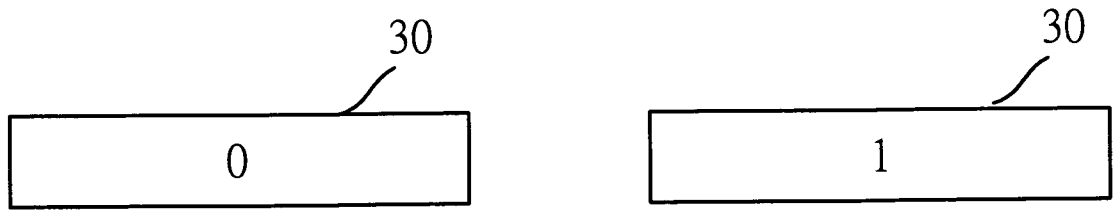
FIG. 3 is a schematic drawing showing the two statuses of the first flag in accordance with the preferred embodiment of the present invention.

Referring to FIG. 1 and FIG. 2, a vehicle burglar alarm system in accordance with the preferred embodiment of the present invention is shown installed in a vehicle 90 and comprised of an on-vehicle main unit 10 and a GPS (Global Position System) 20. The on-vehicle main unit 10 and the GPS 20 are electrically connected to each other. The on-vehicle main unit 10 comprises a first flag 11 stored therein, which has a first status without satellite signal and a second status with satellite signal to indicate satellite signal receiving status of the GPS 20.

The on-vehicle main unit 10 has electrically connected thereto a plurality of sensors 41, 42, 43, a siren 50, and a wireless communication apparatus 51. The sensors 41, 42, or 43 can be a car door sensor, ignition switch sensor, trunk lid sensor, etc. If an abnormal condition occurred at the corresponding location after the vehicle 90 has entered the alarming mode, for example, if the car door is abnormally opened or an external object is inserted into the keyway of the center lock during the alarming mode, the respective sensor outputs an abnormal signal S to the on-vehicle main unit 10, thereby causing the on-vehicle main unit 10 to control the siren 50 to produce a warning sound, informing the owner of the vehicle 90 of the occurrence of an abnormal condition.

After the vehicle 90 has been moved to a sheltered LA (local area) 100 and parked and the owner of the vehicle 90 has set the on-vehicle main unit 10 into the alarming mode, the GPS 20 cannot receive satellite signal, and the first flag 11 is at the first status without satellite signal.

If the vehicle 90 is stolen or towed by a tow truck to another LA (Local Area) 200 that is not sheltered during the alarming mode, the GPS 20 detects a wireless satellite signal. At this time, the on-vehicle main unit 10 changes the first flag 11 from the first status without satellite signal to the second status with satellite signal subject to the status of the GPS 20, and therefore the vehicle 90 is judged to be stolen or towed to another LA 200. At this time, the on-vehicle main unit 10 produces a relocation signal and controls the siren 50 to output a warning sound, informing the owner of the vehicle 90 of the occurrence of an abnormal condition. In addition to controlling the siren 50 to produce an audio alarm A, the on-vehicle main unit 10 will also send an alarm signal to the wireless communication apparatus 51, driving the wireless communication apparatus 51 to send an alarm signal by radio to the communication address assigned by the owner of the vehicle 90. The wireless communication apparatus 51 can be a GPRS cellular telephone, GSM, PDA, etc. The alarm signal provided by the wireless communication apparatus 51 can be a short message, pre-recorded chunk, fax message, or e-mail. The aforesaid communication address assigned by the owner of the vehicle 90 can be the telephone number of the aforesaid GPS 20, the home telephone number, office telephone number, fax phone number, or e-mail address of the owner of the vehicle 90.

During the burglar alarming mode, the on-vehicle main unit 10 can update the status of the first flag 11 periodically subject to the status of the GPS 20 and then check the status. When discovered that the first flag 11 has been changed from the previous first status without satellite signal to the second status with satellite signal, the on-vehicle main unit 10 immediately controls the siren 50 to output an audio alarm, informing the owner of the vehicle 90 of the occurrence of an abnormal condition.

The burglar alarm system of the present invention further comprises a spare battery 60 electrically connected to the on-vehicle main unit 10 and the GPS 20 to provide the burglar alarm system with the necessary working voltage when the battery of the vehicle 90 is low.

Although the present invention has been explained in relation to its preferred embodiment, it is to be understood that many other possible modifications and variations can be made without departing from the spirit and scope of the invention as hereinafter claimed.

What is claimed is:

1. A vehicle burglar alarm system comprising:
   a global position system installed in a vehicle and adapted to receive at least one satellite signal; and
   an on-vehicle main unit installed in the vehicle, said on-vehicle main unit having a first flag stored therein and having electrically connected thereto at least one sensor, at least one alarm, and said global position system, said at least one sensor being installed in the vehicle in a predetermined position and adapted to output a corresponding abnormal signal to said on-vehicle main unit, said on-vehicle main unit controlling said at least one alarm to output an alarm signal correspondingly, said first flag comprising a first status without satellite signal and a second status with satellite signal for indicating satellite receiving status of said global position system;
   wherein when said first flag is changed from said first status without satellite signal to said second status with satellite signal after said on-vehicle main unit has been set into the burglar alarming mode, said on-vehicle main unit will output a relocation signal to said at least one alarm and control said at least one alarm to output another alarm signal.

2. The vehicle burglar alarm system as claimed in claim 1, wherein said at least one alarm includes at least one siren.

3. The vehicle burglar alarm system as claimed in claim 1, said at least one alarm includes a wireless communication apparatus wirelessly connectable to a communication address assigned by the owner of the vehicle.

4. The vehicle burglar alarm system as claimed in claim 3, wherein said communication address is a cellular telephone number.

5. The vehicle burglar alarm system as claimed in claim 3, wherein said wireless communication apparatus is a cellular telephone.

6. The vehicle burglar alarm system as claimed in claim 1, wherein said another alarm signal is a short message.

* * * * *